(12) United States Patent
Dankbar

(10) Patent No.: US 8,171,816 B2
(45) Date of Patent: May 8, 2012

(54) GEAR ARRANGEMENT FOR VEHICLE INCLUDING GEAR LEVER WITH MULTIPLE LEVER RODS

(75) Inventor: Frank Dankbar, Jonkoping (SE)

(73) Assignee: Kongsberg Automotive AB, Mullsjo (SE)

( * ) Notice: Subject to any disclaimer, the term of this patent is extended or adjusted under 35 U.S.C. 154(b) by 1050 days.

(21) Appl. No.: 11/721,715

(22) PCT Filed: Mar. 3, 2006

(86) PCT No.: PCT/SE2006/000278
§ 371 (c)(1),
(2), (4) Date: Mar. 28, 2008

(87) PCT Pub. No.: WO2006/101429
PCT Pub. Date: Sep. 28, 2006

(65) Prior Publication Data
US 2008/0257091 A1    Oct. 23, 2008

(30) Foreign Application Priority Data
Mar. 22, 2005   (SE) ...................................... 0500637

(51) Int. Cl.
*B60K 20/00*  (2006.01)
(52) U.S. Cl. .................................................. 74/473.35
(58) Field of Classification Search .................. 74/473.3, 74/473.33, 473.34, 473.35; 701/51
See application file for complete search history.

(56) References Cited

U.S. PATENT DOCUMENTS

| | | | | |
|---|---|---|---|---|
| 5,220,984 A | * | 6/1993 | Ruiter | 192/220.4 |
| 5,598,740 A | * | 2/1997 | Itoh | 74/473.23 |
| 6,601,685 B2 | * | 8/2003 | Nagasaka et al. | 192/218 |

FOREIGN PATENT DOCUMENTS

| | | | |
|---|---|---|---|
| DE | 4236228 | | 4/1994 |
| DE | 10315643 B3 | * | 10/2004 |
| EP | 1138984 | | 10/2001 |
| EP | 1182381 | | 2/2002 |

* cited by examiner

*Primary Examiner* — Vicky Johnson
(74) *Attorney, Agent, or Firm* — Steven M. Jensen; Edwards Wildman Palmer LLP

(57) ABSTRACT

The invention relates to a gear lever (100) for a motor vehicle, comprising a first lever rod (110) and a second lever rod (120) arranged in association with this. Both the lever rods have a first and a second end, and the second lever rod (120) is movable, so that it can be moved in its longitudinal-direction in relation to the first lever rod (110) by an action by the driver of the vehicle. The second lever rod is spring-loaded (150) in relation to the first lever rod, so that it can be returned to an initial position, and the gear lever (100) comprises, in addition, a sensor arrangement with a sensor component (160). The sensor arrangement is attached to the second lever rod (120) via at least one arm (170) in such a way that it can pivot, so that the sensor arrangement can move with the second lever rod when this moves in relation to the first lever rod, both when the second lever rod is moved in its longitudinal direction and when the gear lever is moved between the different gear positions.

16 Claims, 4 Drawing Sheets

GEAR ARRANGEMENT FOR VEHICLE INCLUDING GEAR LEVER WITH MULTIPLE LEVER RODS

TECHNICAL FIELD

The present invention relates to a gear lever for a motor vehicle, comprising a first lever rod and a second lever rod arranged in association with this. Both the lever rods have a first and a second end, and the second lever rod is movably arranged, so that it can be moved in its longitudinal direction in relation to the first lever rod by an action by the driver of the vehicle. In addition, the second lever rod is spring-loaded in relation to the first lever rod, so that it can be returned to an initial position, and, in addition, the gear lever comprises a sensor arrangement.

BACKGROUND ART

In motor vehicles with automatic or semi-automatic gearboxes, there is often a gear selector with a gear lever that is provided with a button or the like that is to be depressed in specific situations, for example when the gear lever is in the position "P" and is to be moved to any one of the other positions, or when moving the gear lever from a position for automatic gear changing to a position for semi-automatic gear changing.

In gear selectors with so-called "shift by wire" technology, in other words gear selectors where the position of the gear lever is detected by means of electronics and is then transmitted to the gearbox, there is a need to be able to detect by electronic means that such a button has been depressed.

DISCLOSURE OF INVENTION

An arrangement that meets the need that is described above, in other words electronic detection of the depression of a button on a gear lever, is provided by the present invention, in that it describes a gear lever for a motor vehicle, comprising a first lever rod and a second, lever rod arranged in association with this, both of which lever rods have a first and a second end.

The second lever rod is movably arranged, so that it can be moved in its longitudinal direction in relation to the first lever rod by an action by the driver of the vehicle, and the second lever rod is also spring-loaded in relation to the first lever rod, so that it can be returned to an initial position.

In addition, the gear lever comprises a sensor arrangement that is attached to the second lever rod via at least one arm in such a way that it can pivot, so that the sensor arrangement can move with the second lever rod when this moves in relation to the first lever rod, both when the second lever rod is moved in its longitudinal direction and when the gear lever is moved between different gear positions.

The second lever rod can be an inner lever rod, arranged inside the first lever rod, that is an outer lever rod, in such a way that it can move, or alternatively the second lever rod can be an outer lever rod that is arranged outside the first lever rod, that is an inner lever rod, in such a way that it can move.

The invention also relates to a gear arrangement in a motor vehicle, comprising the gear lever as mentioned above, where the gear lever can be moved in at least a first gear path. The gear arrangement comprises, in addition, a console in which are arranged a number of first sensors that detect the position of the sensor arrangement in the gear lever, and the first sensors are arranged in a path that corresponds to the movements of the gear lever in the said first gear path. The arrangement also comprises at least one additional sensor arranged in a direction in relation to one of the said first sensors that corresponds to the movement of the inner lever rod inside the outer lever rod, so that the said action by the driver can be detected.

By means of the invention, a gear lever is achieved that can provide the same functionality as previously-known gear levers with built-in controls, but that has considerably cheaper cabling than previously-known gear levers and is considerably cheaper to manufacture.

BRIEF DESCRIPTION OF DRAWINGS

The invention will be described in greater detail in the following, with reference to the attached drawings, in which.

PREFERRED EMBODIMENTS

Figure 1:
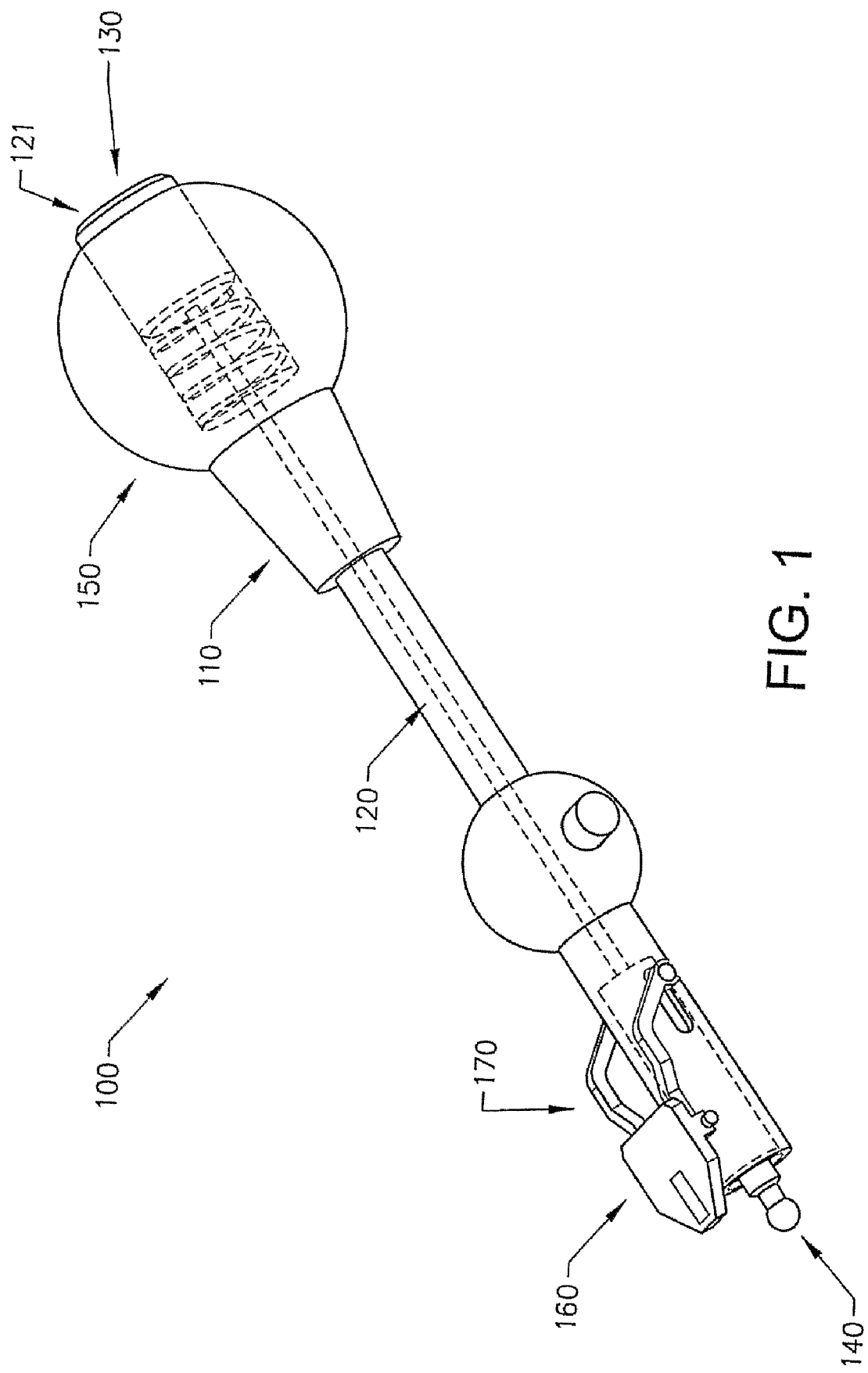
FIG. 1 shows a gear lever according to the invention.

FIG. 1 shows an embodiment of a gear lever 100 according to the invention. As can be seen, in this embodiment the gear lever 100 comprises a first outer lever rod 110 inside which runs a second inner lever rod 120. The outer lever rod 110 has a first and a second end, as has the inner lever rod 120 that also has a first and a second end.

It should be emphasized that when it is stated that the inner lever rod 120 "runs inside the outer lever rod 110", this does not necessarily mean that the outer lever rod surrounds the inner lever rod for the whole of the length of the inner lever rod. It can also be as shown in FIG. 1, namely that the outer lever rod only surrounds the inner lever rod for a part of the length of the inner lever rod, which is sufficient to guide the inner lever rod in a desired way. Alternatively, the inner lever rod can be shorter than the outer lever rod, and thereby only extend for a part of the length of the outer lever rod.

The inner lever rod 120 has a first end 121 that can be accessed at the first end of the outer rod via a button 130. The button 130 can be a separate button arranged on the first end of the inner lever rod, or, alternatively, it can be an integrated part of the inner lever rod 120 that can possibly have been designed in a special way. By means of the button 130, the inner rod can be operated by the driver, by pressing it in a direction away from the first end of the outer rod towards its second end.

At least the second end of the outer rod 110 is intended to be mounted on a pivot point 140 around which the whole gear lever 100 can be maneuvered. As shown in FIG. 1, the inner lever rod 120 is spring loaded by a spring 150 that ensures that, if the inner lever rod 120 is pressed into the outer lever rod, the inner lever rod can be returned afterwards to an initial position. The spring 150 is suitably a coil spring that is arranged around the inner lever rod.

The gear lever 100 comprises, in addition, a sensor arrangement 160, which is attached to the inner lever rod 120, via an arm 170, in such a way that it can pivot. As a result of its attachment, the sensor arrangement will move with the inner lever rod when the inner lever rod is moved in relation to the outer lever rod, both when the inner lever rod 120 is moved in its longitudinal direction and when the gear lever 100 is moved between different gear positions. In the example that is shown in FIG. 1, the sensor arrangement 160 is also attached to the arm 170 in such a way that it can pivot.

The button 130 is intended to be used for operating functions that can be handled from the gear lever but that are not necessarily associated directly with the positions of the gearbox, even though such functions can, of course, also be handled by means of the button 130. Examples of such functions that can be handled by means of the button 130 are a locking function that must be unlocked when the gear lever is to be moved between a "path" for automatic gear changing and a different "path" for manual or semi-manual gear changing, or that the button must be depressed when the gear lever is to be moved from the "P" position in a car with an automatic gearbox.

Figure 2:
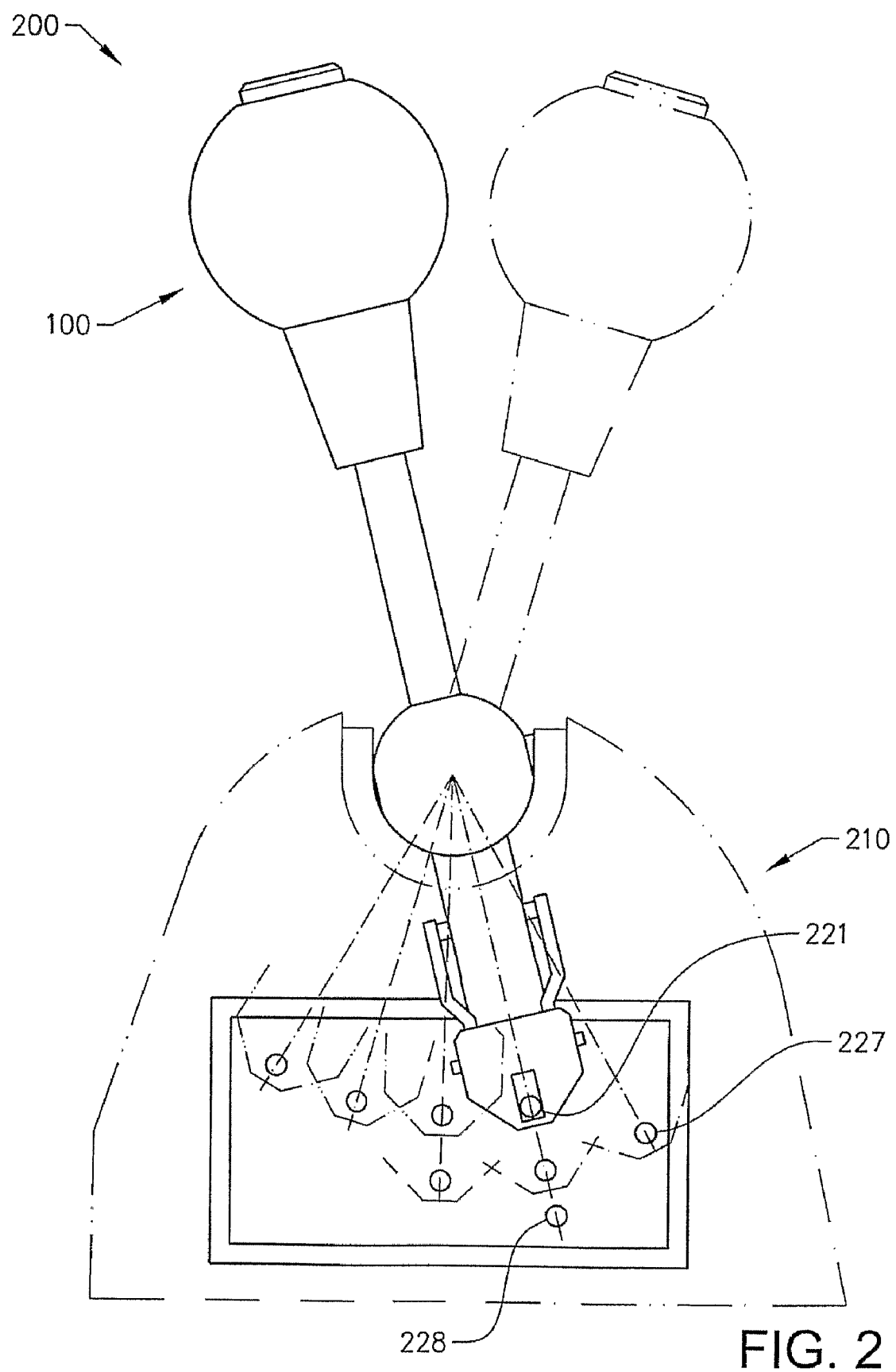
FIG. 2 shows a gear arrangement with a gear lever according to the invention.

FIG. 2 shows a gear arrangement 200 comprising the gear lever 100 from FIG. 1. In addition to the gear lever 100, the arrangement 200 also comprises a console 241 in which are arranged a number of first sensors 221-227 that can detect the position of the sensor arrangement in the gear lever. The principle for the detection of the sensor arrangement by the sensors can be selected from a large number of known such principles, including, for example, magnetic, optical and electrical/electromagnetic principles. In a preferred embodiment, the sensor arrangement is a magnet and the detectors are sensors that are sensitive to magnetism.

The sensors 221-227 are arranged in a first "path" that corresponds to the positions of the gear wherein a first gear change movement that, for example, can be any one of the positions in automatic gear changing (P, R, N, D) or any one of the positions for semi-automatic gear changing (+/−). In the example shown in FIG. 2, both these possibilities are available, in other words there are sensors in a first and a second path that correspond to these two possibilities: automatic and semi-automatic.

As shown in FIG. 2, the gear lever can be moved in its gear-changing movement between the different gear positions, whereupon the sensor arrangement will move with the gear lever and, in the different positions of the gear lever, will be able to be detected by the sensor for the respective position, so that the gear position will be able to be sent from the sensor to a control device (not shown) that, for example, comprises a microprocessor. The control device ensures, in turn, that the gearbox assumes the required position.

One of the objects of the invention is to make possible simpler maneuvering of functions that are handled by means of a button arranged on or in association with the gear lever 100. For this purpose, the gear lever 100 and accordingly also the gear arrangement 200, that is shown in FIG. 2 and that is shown in greater detail in FIG. 3, comprise at least one additional sensor 228.

The additional sensor 228 is arranged in a direction in relation to one of the said first sensors that corresponds to the movement of the inner lever rod inside the outer lever rod when the inner lever rod is subjected to an action by the driver by the button 130 being depressed.

Figure 3:
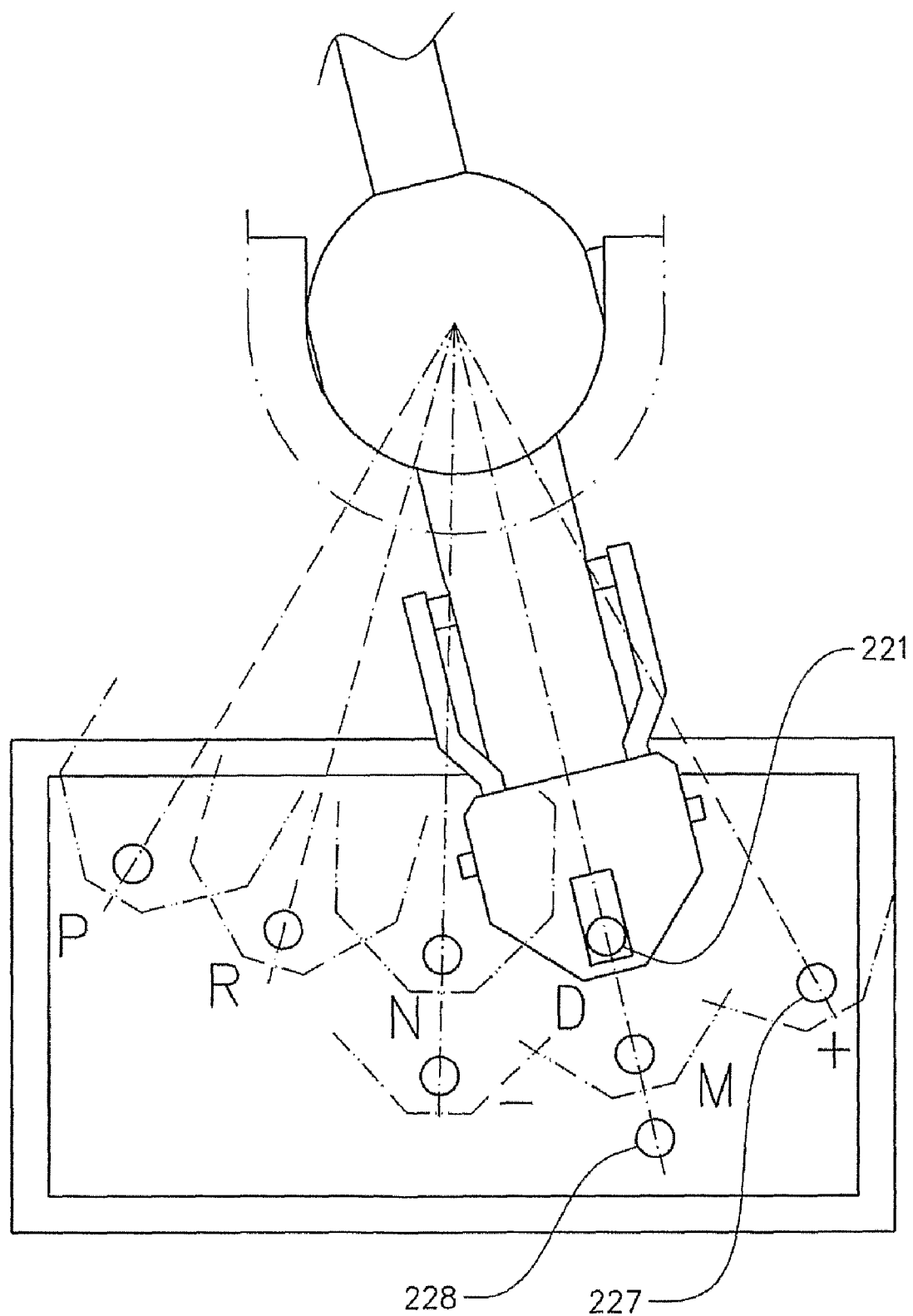
FIG. 3 shows a sensor arrangement in the arrangement from FIG. 3, and FIGS. 4 and 5 show different positions for the sensor arrangement from FIG. 4.

In the example that is shown in FIG. 3, the button 130 on the gear lever 100 is used as a locking device that must be depressed when the gear lever is to be changed over from a position for fully automatic gear changing with, for example, the positions P-R-N-D to a position for semi-automatic gear changing with, for example, the positions. "+", "M" and "−". For this reason, the example in the figure comprises only one additional sensor, arranged in the said direction. The change-over between the two said positions is carried out, for example, by the gear lever being moved in a direction that essentially at right angles to the movements that are made in the respective positions.

Figure 4:
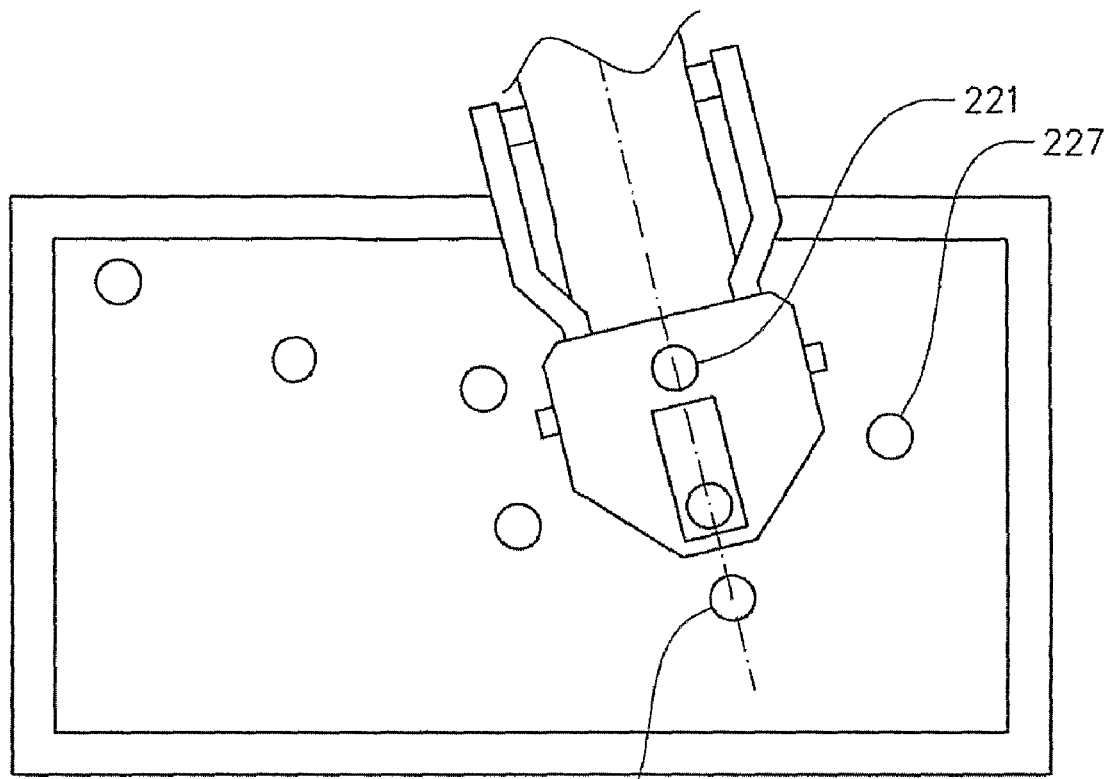
Figure 5:
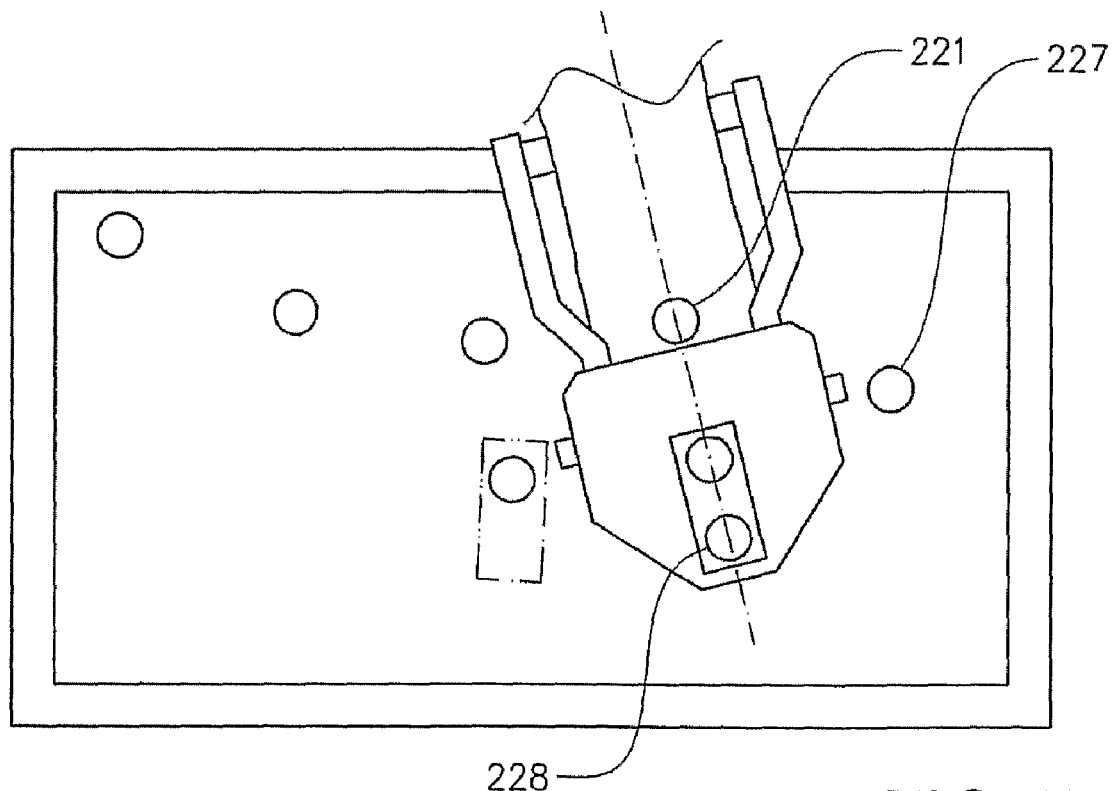

FIGS. 4 and 5 show the interaction between the sensor arrangement and the sensors in greater detail. FIG. 4 shows the gear lever and hence also the sensor arrangement in a position where the button 130 is not depressed, and where the gear lever is in the semi-automatic position, in this case the position "M". In other words, in FIG. 4 the sensor arrangement "covers" the sensor that corresponds to the position. "M".

FIG. 5 shows a position in which the button 130 on the gear lever has been depressed, in other words the inner rod has been caused to move inwards inside the outer rod, which has also caused the sensor arrangement to move in the same direction, in other words a direction that corresponds to the direction "inwards" in the gear lever. The drawing shows that in this position (button depressed), the sensor arrangement is positioned in such a way that it can be detected both by the sensor for the position "M" and by the additional sensor.

The sensor arrangement has a design that is such that it can be detected by both the said first sensor ("M" in this case) and the said additional sensor. In other words, its length is such that, in the depressed position, it "reaches" both sensors.

The control device detects that the sensor arrangement has been detected in both the position "M" and in the additional, position, and, accordingly allows the gear lever to be moved mechanically from the semi-automatic position to the automatic position, for example by releasing a mechanical locking device that is not described here in greater detail.

The gear arrangement and its control device are, of course, arranged to allow the converse to take place, in other words a change-over of the gear lever from the automatic position to the semi-automatic position. For this movement, it is, however, also necessary for the sensor arrangement to be detected by two predefined adjacent sensors. Which these sensors are can, of course, be varied, if so required, and, in the same way, the principle can also be waived concerning two simultaneous detections being required to allow a particular movement of the gear lever.

As shown in, for instance, FIG. 1, the sensor arrangement can be attached to the arm, via which it is connected to the inner rod, in such a way that it can pivot, and can also be spring-loaded in the direction towards the console wall. This can be used to ensure that the sensor arrangement is always urged towards the console wall where the sensors are arranged, which, in turn, ensures that there is a good signal for the detection to be carried out.

The invention is not limited to the examples of embodiments that are described, but can be varied freely within the scope of the attached claims. For example, the inner rod that has been described above can be replaced by a movable rod that runs outside the fixed part of the gear lever, in other words outside the part that has been described as the outer rod in the example above. Another possible variation is to let the sensor arrangement move in the opposite direction towards the button, in other words an action "inwards" in the direction of the gear lever can cause the sensor arrangement to move "outwards" in the gear lever.

The invention claimed is:

1. A gear lever for a vehicle, comprising:
   a first lever rod;
   a second lever rod movably arranged with respect to the first lever rod, the second lever rod configured to move in a longitudinal direction, wherein the second lever rod is an inner lever rod arranged inside the first lever rod;
   a sensor arrangement operably connected to the second lever rod to convey movement of the second lever rod; and an arm positioned between the sensor arrangement and the second lever rod such that the sensor arrangement is pivotable relative to the second lever rod.

2. The gear lever of claim 1, wherein the second lever rod is spring loaded, such that upon movement of the second lever rod, the second lever rod is biased to return to an initial position.

3. The gear lever of claim 1, further comprising a button operably connected to the second lever rod.

4. The gear lever of claim 3, wherein the button is depressed to move the second lever rod.

5. The gear lever of claim 3, wherein the button is user operated.

6. The gear lever of claim 3, wherein the second lever rod has first and second ends, and the button is arranged at the first end of the second lever rod.

7. The gear lever of claim 1, wherein the sensor arrangement is coupled to the second lever rod such that the sensor arrangement and the second lever rod move with respect to the first lever rod.

8. The gear lever of claim 1, wherein the sensor arrangement comprises a magnet.

9. A gear arrangement for a vehicle, comprising:
a gear lever including a first lever rod, a second lever rod movably arranged with respect to the first lever rod in a longitudinal direction, and a sensor arrangement operably connected to the second lever rod, wherein the second lever rod is an inner lever rod arranged inside the first lever rod;
the second lever rod being movable along first and second gear paths;
a plurality of first sensors arranged along the first gear path for detecting the sensor arrangement; and
a plurality of second sensors arranged along the second gear path for detecting the sensor arrangement,
wherein the second lever rod is movable between the first and second gear paths by actuating the second lever rod to move in the longitudinal direction.

10. The gear arrangement of claim 9, further comprising at least one additional sensor positioned with respect to at least one of the first sensors and second sensors, the at least one additional sensor configured to detect movement of the second lever rod in the gear lever.

11. The gear arrangement of claim 10, wherein the sensor arrangement is detectable by at least one of the first sensors and second sensors and the at least one additional sensor, such that upon detection of the sensor arrangement by the at least one additional sensor, the second lever rod is movable between the first and second gear paths.

12. A method for operating a gear lever in a vehicle, comprising the steps of:
providing a gear lever including a first lever rod, a second lever rod movably arranged with respect to the first lever rod in a longitudinal direction, and a sensor arrangement operably connected to the second lever rod, wherein the second lever rod is an inner lever rod arranged inside the first lever rod;
operating the second lever rod to move in the longitudinal direction with respect to the first lever rod;
detecting the sensor arrangement;
determining a position of the gear lever along one of a first gear path and a second gear path, the first and second gear paths each including a plurality of sensors each configured to detect the sensor arrangement; and
actuating the second lever rod to move from the at least one of the first and second gear paths to the other of the first and second gear paths.

13. The method of claim 12, further comprising the step of: detecting a position of the second lever rod in the gear lever.

14. A gear lever for a vehicle, comprising:
a first lever rod;
a second lever rod movably arranged with respect to the first lever rod, the second lever rod configured to move in a longitudinal direction;
a sensor arrangement operably connected to the second lever rod to convey movement of the second lever rod;
a button operably connected to the second lever rod; and
an arm positioned between the sensor arrangement and the second lever rod such that the sensor arrangement is pivotable relative to the second lever rod.

15. The gear lever of claim 14, wherein the button is user operated.

16. The gear lever of claim 14, wherein the second lever rod has first and second ends, and the button is arranged at the first end of the second lever rod.

* * * * *